Figure 1:
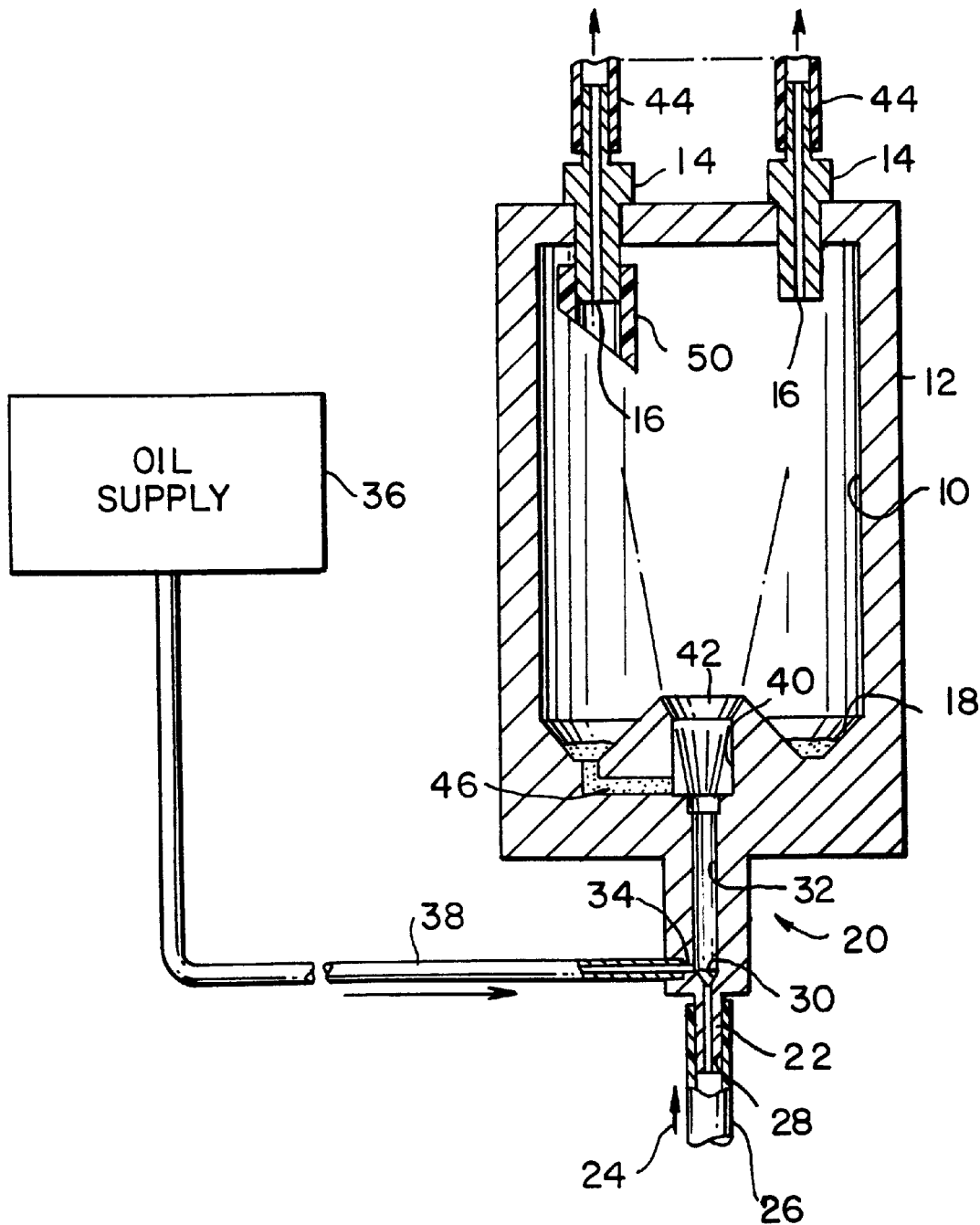

United States Patent
Cotler

[11] Patent Number: 6,161,649
[45] Date of Patent: Dec. 19, 2000

[54] OIL LUBRICATOR APPARATUS WITH IMPROVED LOW FLOW RATE CHARACTERISTICS

[75] Inventor: Elliot M. Cotler, Brooklyn, N.Y.

[73] Assignee: Uniwave, Inc., Farmingdale, N.Y.

[21] Appl. No.: 09/156,153

[22] Filed: Sep. 18, 1998

[51] Int. Cl.[7] .................................................. F01M 1/08
[52] U.S. Cl. ........................ 184/6.26; 184/6.15; 184/58
[58] Field of Search ................................. 184/6.15, 6.26, 184/55.1, 58; 239/104, 288, 288.3, 288.5

[56] References Cited

U.S. PATENT DOCUMENTS

| | | | |
|---|---|---|---|
| 3,624,763 | 11/1971 | Rohr | 184/6.15 |
| 4,353,435 | 10/1982 | Abrams et al. | 184/6.26 |
| 4,637,551 | 1/1987 | Seeger, Jr. et al. | 239/288.5 |
| 5,273,215 | 12/1993 | Hans et al. | 239/288.5 |
| 5,830,334 | 11/1998 | Kobayashi | 239/104 |

*Primary Examiner*—David A. Bucci
*Assistant Examiner*—Chong H. Kim
*Attorney, Agent, or Firm*—Schweitzer Cornman Gross & Bondell LLP

[57] ABSTRACT

A device for controlling the flow of an oil mist through barb outlets in a lubricating oil distributor having a mist-receiving chamber into which the barb outlets extend comprises a fitting mounted to the barb to collect oil precipitating and flowing upon the exposed surfaces of the barb and fitting and divert the collected oil away from the mist entranceway of the barb. The collected oil is thus prevented from being entrained by the mist flow through the barbs and increasing the oil output from the distributor.

11 Claims, 3 Drawing Sheets

OIL LUBRICATOR APPARATUS WITH IMPROVED LOW FLOW RATE CHARACTERISTICS

BACKGROUND OF THE INVENTION

The lubrication of equipment, such as knitting machinery, is often accomplished by the use of an oil mist lubrication system. In such systems, lubricating oil is suspended as an aerosol or mist in a stream of air, and is carried through a tube to a remote location requiring lubrication. The oil is placed in the aerosol state at a central mist-generating location and then may be transmitted by a distributor to the desired locations at the equipment.

Improvements in the efficiency of mist transmission, as well as the development of distribution spray nozzles which are capable of delivering precisely-directed mists at low flow rates, necessitate mist generators which are capable of generating and delivering oil mist streams which are of the appropriate oil concentration. Due to the construction of many conventional generators, this requirement has been difficult to meet.

In particular, generators of the type as shown in U.S. Pat. No. 4,353,435, utilize a mist generator which includes a chamber into which an oil mist is sprayed. The oil mist exits the chamber through a series of fittings or barbs extending through the upper end of the chamber, the barbs having tubes affixed thereto to deliver the mist as required. Because of the positioning of the barbs, however, it has been found that the oil spray, containing both the airborne oil mist and heavy droplets which the upper, inner surface of the chamber and the exposed exterior surfaces of the barbs comes out of suspension and forms a solid oil film which migrates to the lower end of the barbs under the influence of gravity. The film collects at the end of the barb, and is captured by the oil spray stream entering the barbs into and through the barbs and tubes, in addition to the mist being carried thereby, whereby the amount of oil ultimately dispensed by the lubrication system is greater than that intended for distribution by the mist alone.

A decrease in the volume of oil being transmitted can be accomplished by a reduction in the volumetric air flow rate through the chamber, such as by decreasing the pressure thereof. With decreased pressure, however, insufficient velocity is provided to the mist whereby the flow and dispersion characteristics of the lubrication system can be distorted and degraded. In addition, a certain velocity level is needed to create a proper mist.

Accordingly, it is a purpose of the present invention to provide an improved oil mist generator which is capable of improved control over low oil volume flow rates.

Another purpose of the present invention is to provide an improved oil mist generator having means for collecting and recycling oil which collects on interior portions of the generator.

Yet another purpose of the present invention is to provide an improved oil mist generator having resistance to overload resulting from unwanted mist collection.

A further purpose of the present invention is to provide such an improved oil mist generator which is of economical construction and which requires minimal alteration to conventional systems.

Still another purpose of the present invention is to allow two levels of lubrication to be provided from a simple mist generator unit.

BRIEF DESCRIPTION OF THE INVENTION

In accordance with the foregoing and other and further purposes and objects, an oil mist distributor constructed in accordance with the present invention includes a chamber into which an oil-air spray of mist or aerosol is directed, at least one barb or fitting coupled to aerosol distribution means and having a first end extending into the chamber for receipt of the aerosol. Each of the barb first ends is provided with means for collecting oil which precipitates upon or migrates to the exterior surface of the barb and for channeling the oil away from the fitting entranceway. The collected oil can be delivered to an oil repository of spray in the chamber for regeneration in mist form.

To assist in the collection and channeling of the oil, the means may be formed of a material having a greater oleophilic characteristic than that of the barb to which it is attached.

To further allow the collected oil to gather itself into a form which is more susceptible of being delivered to the repository under the influence of gravity, the collector means may be formed with a lower tapered portion which assists in the collected oil forming a droplet which, under the influence of gravity, falls to the oil repository. When the means is in the form of a tube mounted upon the barb, the distal end of the tube may be cut at a bias, yielding a lower edge towards which the collected oil migrates. By placing the means on selected barbs in a multiple barb distributor the lower flow rate resulting from such use can be generated concurrently with a higher flow rate through barbs not having the means.

A fuller understanding of the present invention may be achieved upon consideration of the following detailed description of a preferred, but nonetheless illustrative embodiment thereof, when considered in connection with the annexed drawings, wherein:

FIG. 1 is a view of a portion of a lubricant distributor with which the present invention is employed;

FIG. 2 is a detail sectional view of a portion of FIG. 1 depicting a barb of the distributor with the present invention mounted thereon;

FIG. 3 is a schematic representation of a bottom plan view of the top wall of a distributor depicting an arrangement of barbs with fittings mounted thereon; and FIG. 4 is a detail sectional view of an alternative embodiment of the invention.

DETAILED DESCRIPTION OF THE INVENTION

Referring initially to FIG. 1, an oil mist distribution system with which the present invention is utilized may include an air-jet injector pump and expansion chamber as depicted therein. Expansion chamber 10 is defined by a sealed housing 12. A plurality of barbs or nipples 14 each having inlet openings 16 are mounted in the top wall of the housing, preferably in an essentially circular array, with the inlet openings projecting into the expansion chamber 10. The bottom wall of the housing 12 is formed with an annular trough 18 about its outer periphery to receive excess lubricant from an essentially conical lubricant spray which does not enter the inlet openings 16.

An air injector pump 20 includes an air inlet 22 which receives air under pressure transmitted in the direction of arrow 24 through tubing 26 connected to an appropriate air source. The air passes through passageway 28 to short conical section 30 opening into and forming the lower end of wider diameter duct 32. The passage from the constricted passage portion 28 to the wider passage portion 32 produces a low pressure venturi effect, drawing oil fed to the venturi from oil outlet duct 34 connected to an oil supply 36 by tubing 38. The oil supply may consist of any known metering system, including mechanical, electrical hydraulic or pneumatic devices, as known in the art.

From the duct 32, the air-oil stream enters a preliminary expansion chamber 40 of greater diameter than duct 32 but of a substantially lesser diameter than that of expansion chamber 10. Outlet opening 42, located at the upper end of the preliminary expansion chamber 40, projects an essentially conical spray of lubricant to the inlet openings 16 of the barbs 14.

The pressure developed by the admitted air carries the oil mist through the barb inlet openings 16 and through attached piping 44, whereby the lubricant mist is directed to the portions of the remote equipment requiring lubrication. In addition to the portion of the mist spray entering the inlets, the spray contacts and condenses upon the inner surfaces of the expansion chamber, as well as upon the exposed surfaces of the barbs 14. The oil which reaches the side wall of the chamber flows downwardly under the influence of gravity into the collection trough 18, whereby it is fed through return duct 46 to the lower portion of the preliminary expansion chamber 40 where it may be again carried by the air stream in the form of a mist.

The oil spray which collects upon exposed portions of the barbs 14, however, collect and migrate downward to the lower ends of the barbs, where it becomes entrained by the aerosol flow passing into the openings 16, and is carried by the air flow into the piping 44 to the remote lubrication location. Such additional oil can overload the distribution system, or otherwise deleteriously affect the desired lubrication levels.

Figure 2:
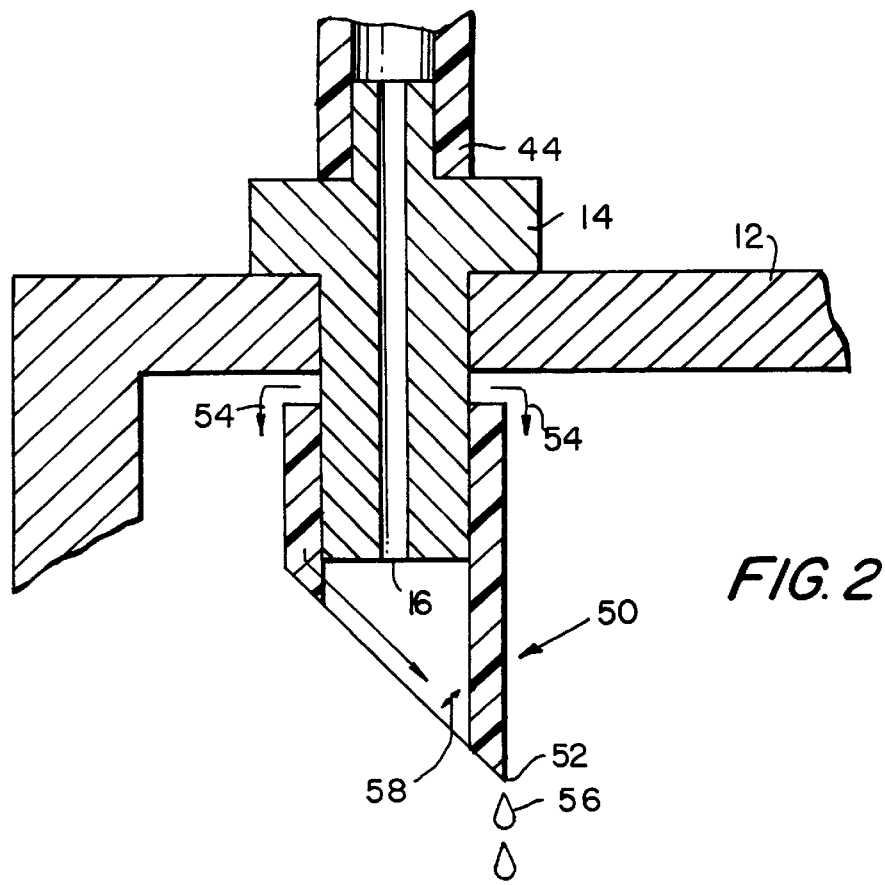
Figure 3:
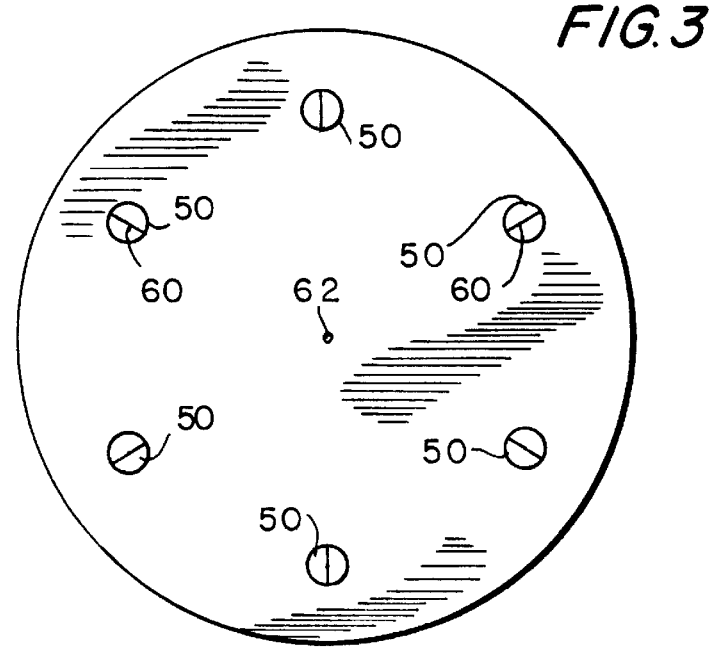
Figure 4:
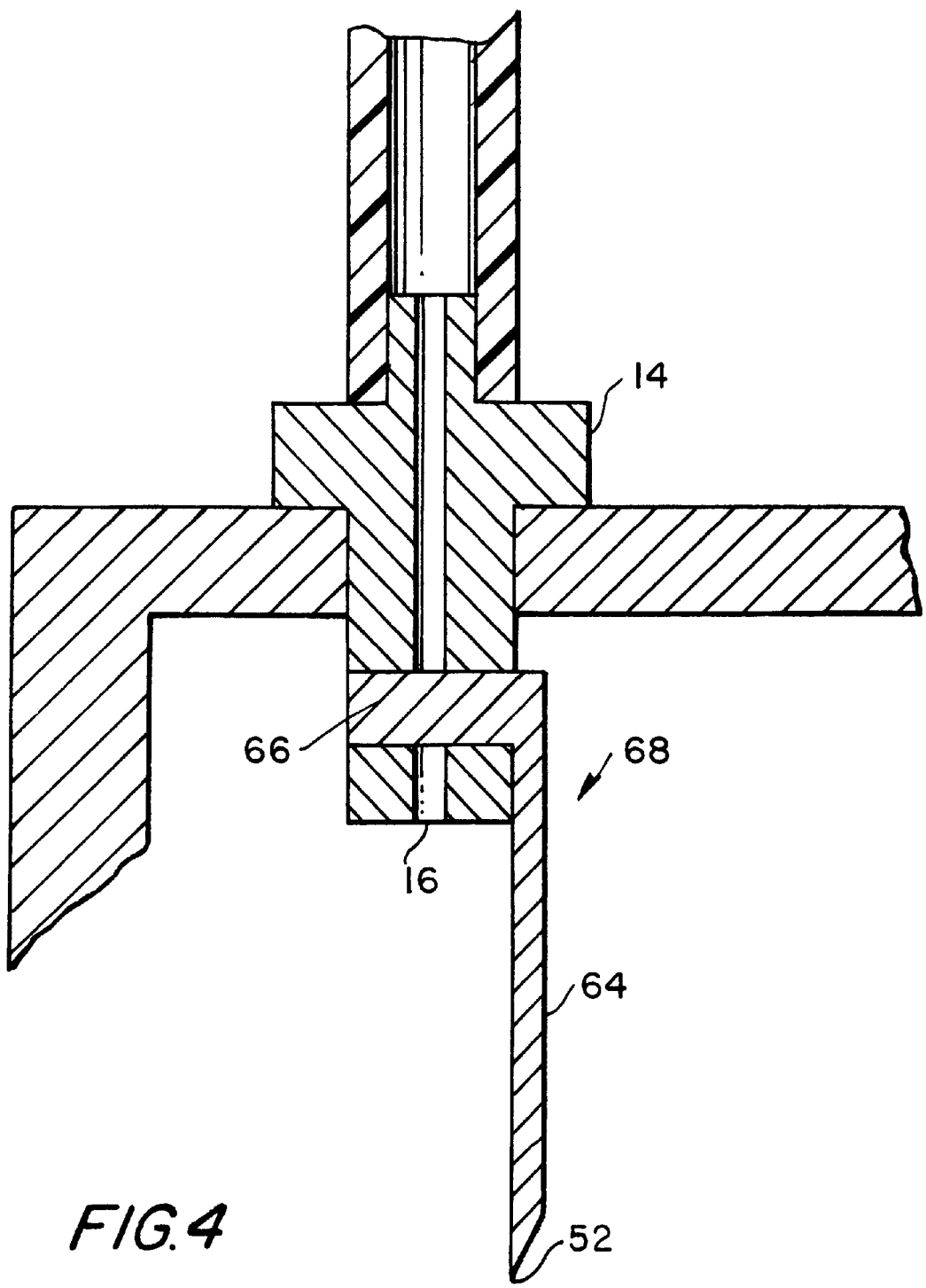

As depicted in FIG. 2, the present invention comprises means for channeling the oil which would otherwise collect on the barb away from the opening 16. The means is preferably in the form of a fitting 50. Fitting 50, which is affixed to the lower end of the barb 44, provides an auxiliary, downward-facing surface upon which the oil which would otherwise collect directly upon the outer surface of the barb 14 can precipitate, collect and flow. The collected oil, under the influence of gravity, travels down the outside surface of the fitting. Preferably, the fitting may be constructed of a material more oleophilic than that of the barb 14, whereby oil collecting on the remaining exposed surface of the barb is further urged to flow onto the outer surface of the fitting.

As shown in FIG. 2, the fitting may be in the form of a hollow cylinder of polyethylene tubing, which when used in conjunction with brass barbs 14, has a greater oleophilic value than the barb. The inner diameter of the tubing is chosen to have a friction fit about the barb. The lower end of the tubing is cut on a bias or angle, resulting in the formation of a tapered bottom surface for the fitting ending in an edge having a point 52. The formation of the point 52, which represents the lowest point on the fitting, provides a point of collection for the oil, which migrates downwardly around the exterior of the fitting as shown by the arrows 54. As the oil collects at the point 52, it forms droplets 56, which when their weight exceeds the surface tension force, drop under the influence of gravity, to be collected by the reservoir 18 as shown in FIG. 1.

Because the fitting terminates in an edge and point 52, collection of the oil is concentrated at the point 52. This minimizes the oil exposure to the mist stream entering the barb opening 16, minimizing the ability of the stream to collect the oil.

In addition, the biased lower edge of the fitting forms an inlet opening to the passageway through the barb and to the remote lubrication target which is of substantially increased area than the bore opening 16 itself. The smaller the acute angle 58 measured between the side wall of the fitting and its end surface, the greater the effective area of the opening. As this opening area increases, the difference between the velocity of the air flow within the chamber and its entrance into the fitting decreases. flow in entraining oil from the fitting edge and carrying it through the barb is decreased. Because the ratio of fitting inlet area to barb opening 16 area is significant, the rate of oil transfer into the incoming flow is substantially decreased. Further, the velocity distribution across the aperture of the fitting is not constant. It is believed that maximum velocity is attained at its upper edge, the velocity profile diminishing across the opening of the fitting to a low value at the lower edge point 52. This still further contributes to a significant lessening of the transfer of the oil collected at edge point 52 into the fitting by the incoming air flow.

FIG. 3 is a diagrammatic representation of the fittings 50 upon a circular arrangement of the top surface of the expansion chamber 10. As shown therein, it is preferred that the planes of the lower surfaces of the fittings 50, represented by lines 60, are in a radial direction from the center 62 of the circle around which the barbs are located. Due to the angled nature of the fitting lower surfaces, a degree of whirl is generated by the air flow in the chamber. With the fittings arranged as depicted, the whirl so generated further assists in sweeping the collected droplets from the lower edges of the fittings, thus further decreasing the effectiveness of collection and return of the collected oil to the reservoir.

FIG. 4 represents an alternative embodiment of the fitting. As shown therein, fitting 62 may be in the form of a needle-like probe 64 extending downwardly beyond the lower end of the barb 14. The probe is affixed to the barb by a clamp portion 66, which may fully or partially surround the barb. The oil collects on and migrates down the probe to its lower end where it collects as droplets and falls to the reservoir. The spacing of the probe end from the barb inlet 16 minimizes transfer to the ingoing air flow. Once again, the fitting may preferably be of a more oleophilic material than the barb.

I claim:

1. In a lubricating oil distributor of the type having an oil mist receiving chamber and at least one barb extending into the chamber through a surface thereof, said barb having a passageway therethrough for receipt of the oil mist for delivery through tubing means connected to the barb to a remote lubrication location, the improvement comprising means mounted to the barb for collecting oil on a surface thereof and diverting said collected oil away from said barb passageway.

2. The improvement of claim 1, wherein said means comprises a fitting mounted to a lower portion of the barb of a material having a greater oleophilic character than that of the barb.

3. The improvement of claim 1, wherein said means comprises a fitting mounted to a portion end of the barb, said fitting having a lower end of a tapered configuration.

4. The improvement of claim 3, wherein said fitting comprises a tube having a lower end formed at an acute angle to the side wall of the tube.

5. The improvement of claim 1, wherein said collecting means includes an oil mist inlet for creating flow through said collecting means to said passageway of a velocity lower than that of the oil mist passing through said passageway.

6. The improvement of claim 3, wherein said fitting comprises a depending, needle-like probe mounted to a side of the barb.

7. The improvement of claim 4, wherein a plurality of barbs are arranged in a circular pattern in the top surface of the chamber, one of said barbs having a fitting, the planes of the lower ends of the fittings being oriented in a radial manner.

8. In a lubricating oil distributor of the type having an oil mist receiving chamber and a plurality of barbs extending into the chamber through a surface thereof, said barb having a passageway therethrough for receipt of the oil mist for delivery through tubing means connected to the barb to a remote lubrication location, the improvement comprising means mounted to at least one of the barbs for collecting oil on a surface thereof and diverting said collected oil away from said barb passageway.

9. The improvement of claim 8, wherein said means comprises a fitting mounted to a lower portion of the barb of a material having a greater oleophilic character than that of the barb.

10. The improvement of claim 8, wherein said means comprises a fitting mounted to a portion end of the barb, said fitting having a lower end of a tapered configuration.

11. The improvement of claim 1, wherein said surface of said means mounted to the barb is an exterior surface.

* * * * *